Oct. 5, 1965  G. W. KELLY  3,209,408
ANTIFRICTION PLASTICIZER HEAD FOR PLASTIC-EXTRUDING MACHINES
Filed June 10, 1963  3 Sheets-Sheet 3

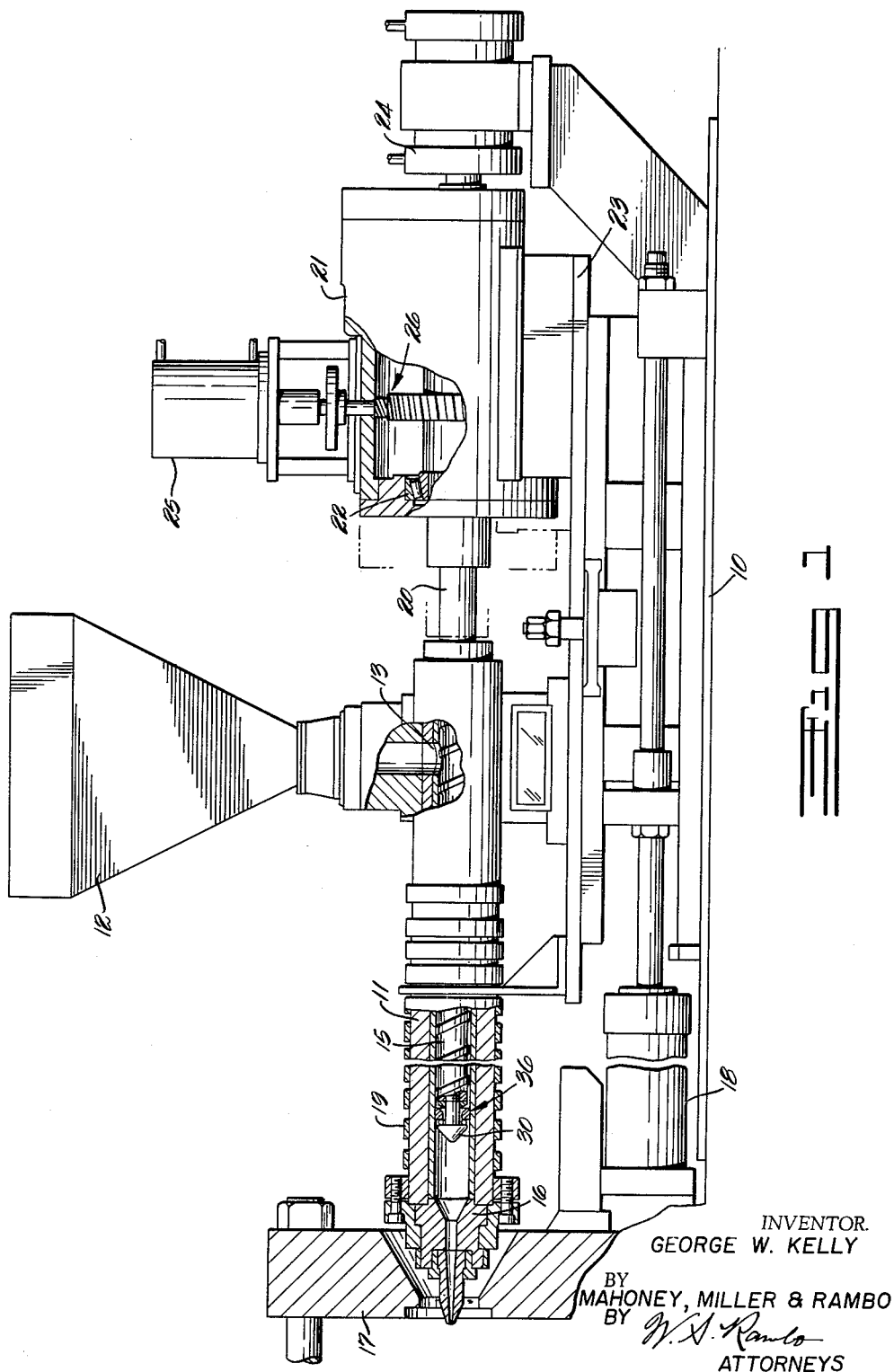

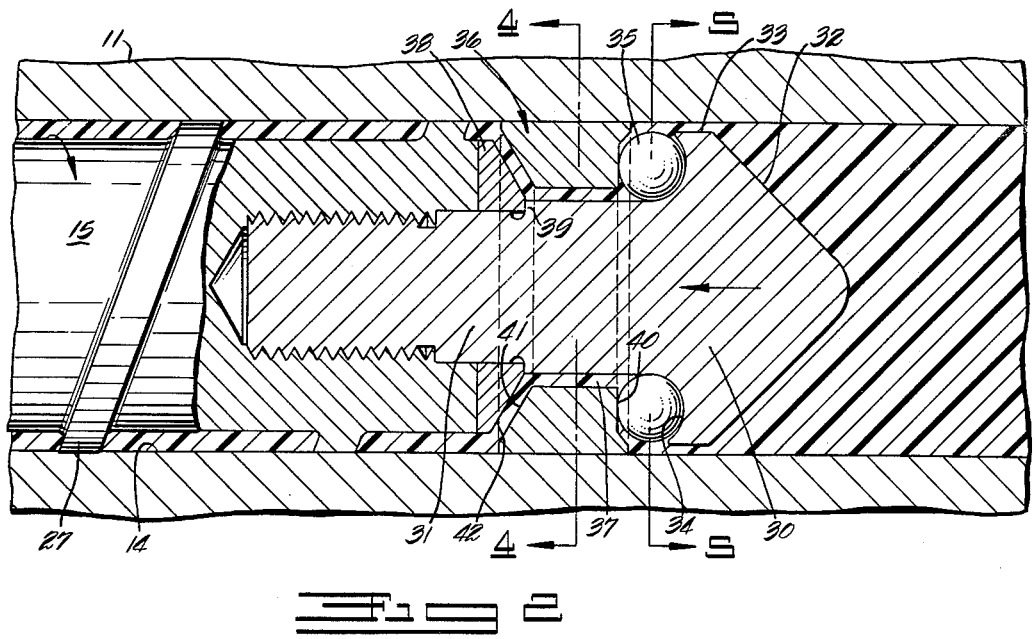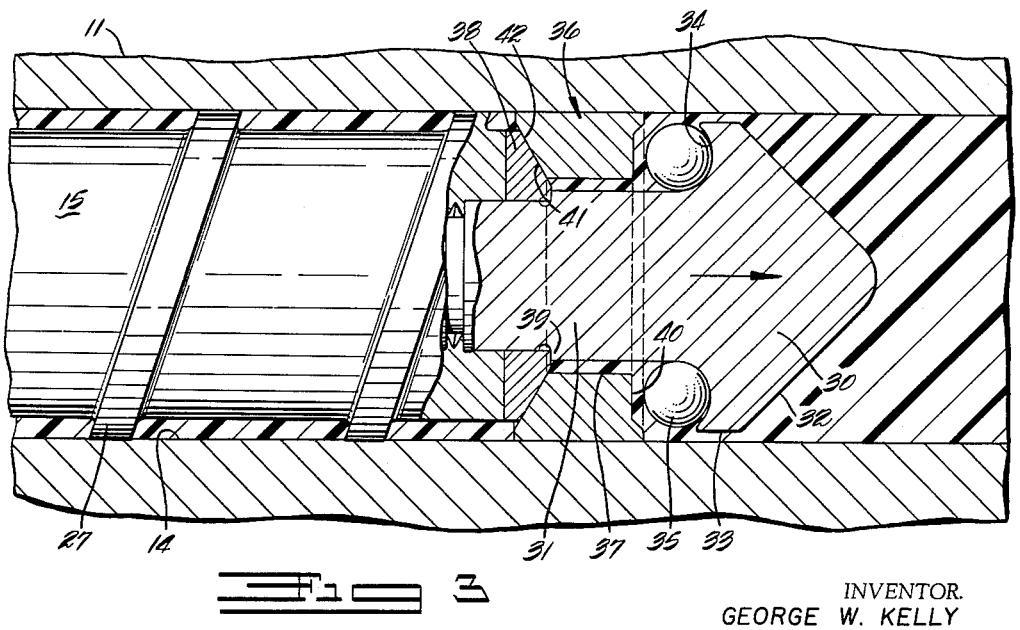

INVENTOR.
GEORGE W. KELLY
BY
MAHONEY, MILLER & RAMBO
BY
ATTORNEYS

United States Patent Office 3,209,408
Patented Oct. 5, 1965

3,209,408
ANTIFRICTION PLASTICIZER HEAD FOR PLASTIC-EXTRUDING MACHINES
George W. Kelly, Columbus, Ohio, assignor to Columbus Plastic Products, Inc., Columbus, Ohio, a corporation of Ohio
Filed June 10, 1963, Ser. No. 286,813
4 Claims. (Cl. 18—30)

This invention relates to an Antifriction Plasticizer Head for Plastic-Extruding Machines. It deals, more particularly, with the extruder head on an extruder screw which rotates to feed and plasticize material supplied into a heated extruder barrel and advances bodily in the barrel to force the material through an extruder head at the outlet end of the body. The invention will be described specifically with reference to a screw injection machine but is not necessarily limited thereto.

In the screw injection machines which have recently come into favor in the plastic forming industry, a driven extruder screw or feed screw operates as indicated above. In this operation, assuming that the screw is in its advanced or forward position after injection, the screw rotates and discharges plasticized material into the front of the extruder barrel. Build-up of plasticized material in front of the screw causes the screw to retract in the barrel against an adjustable pressure. The screw continues to rotate and plasticize material until it contacts, in its retracting movement, a limit switch which is set to insure that a sufficiently large volume of material has been plasticized to make the next mold shot. The injection screw then advances bodily in the barrel at injection speed and displaces the material in front of the screw through a restricted extrusion outlet into the injection mold. In its plasticizing and feeding rotation, the plastic material is forced around the screw through the barrel and through a cooperating ring associated with the screw head and finally through passages in the screw head. The ring is mounted in the barrel for axial sliding movement and is held in contact with the head during the feeding and plasticizing operation. This ring may be part of a non-return flow valve assembly which functions during the injection stroke of the screw to reduce the amount of material extruded rearwardly over the screw flights. However, whether or not the ring is part of a non-return valve, the head and ring contact and there is relative rotation of the head and ring during the feeding operation. The friction developed during this operation increases with the temperature of the plastic material being fed and results in considerable wear on the surface of the head which contacts the ring. Consequently, it is necessary to frequently replace the screw head, which in itself is quite expensive, but even more serious is the time and expense occasioned by the necessary production delays in shutting down the machine to permit the removal and replacement of the head.

It is one of the objects of this invention to provide an antifriction arrangement between the screw head and a relatively rotatable member, such as the associated ring in an extrusion machine of the type indicated, in order to reduce considerably the wear on the head during the feeding and plasticizing operation thereby reducing considerably the shutdown time of the machine required to remove and replace worn heads and the expense of re-placement heads.

Another object of this invention is to provide an antifriction arrangement on the screw head which also functions to more effectively work the plastic material, as it is fed past the screw head, into a more homogeneous plasticized mass.

Various other objects will be apparent from the following description and the attached drawings.

In the accompanying drawings, the preferred embodiment of this invention is illustrated but it is to be understood that specific details may be varied without departing from basic principles of the invention.

In these drawings:

FIGURE 1 is a schematic side elevational view, partly broken away, of a screw type injection molding machine having this invention applied thereto.

FIGURE 2 is an enlarged sectional view taken axially through the extruder cylinder showing in detail the antifriction plasticizer head of this invention, the extruder screw being shown in its rotating feeding and plasticizing operation.

FIGURE 3 is a view similar to FIGURE 2 but showing the extruder screw in its non-rotating advancing injection operation.

Figure 5:
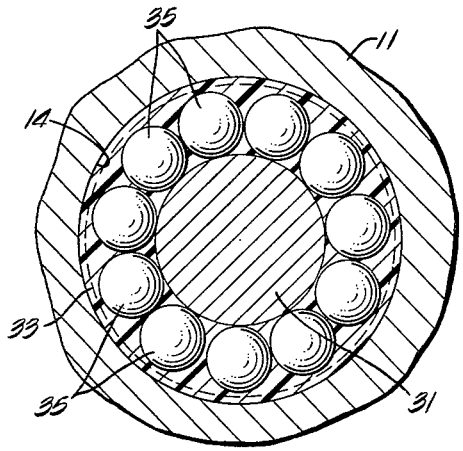
FIGURE 5 is a transverse sectional view taken substantially along line 5—5 of FIGURE 2.

With reference to the drawings, in FIGURE 1 there is illustrated a molding machine or press which has this invention applied thereto although it is to be understood that this invention is not limited to this specific machine.

The machine comprises a base or frame 10 which carries at its forward end the extruder cylinder or barrel 11 which is mounted in a fixed position thereon. A hopper 12 is mounted above the barrel 11 for feeding plastic material thereinto through the barrel inlet 13 located toward its rear end. An extruder screw 15 is mounted in the barrel for both rotating and reciprocating movement. The barrel 11 is provided with suitable heating means, such as the surrounding electric heaters 19 located forwardly of the inlet 13. As indicated previously, the screw 15 serves as a material feeding and plasticizing means and as an extrusion means for forcing the plasticized material through an extrusion outlet collar 16 at the forward or outlet end of the barrel 11 for injection into a mold or die, one section of which is indicated at 17. A pull-in cylinder is indicated at 18 and is one of the cylinders mounted on the base of the machine which are provided for closing the sections of the mold or die.

It will be noted that the rearward extension or shaft 20 of the screw extends rearwardly from the barrel or cylinder 11 and into a bearing and gear reduction unit 21, the portion of the shaft within the housing of the unit being enlarged and being mounted within roller bearings, the forward one of which being indicated at 22. The housing of the unit 21 is axially aligned with the barrel 11 and is mounted for axial reciprocating movement relative thereto on the machine base 10 by means of a suitable guide structure indicated generally at 23. The unit 21 is reciprocated on the base 10, to simultaneously reciprocate the screw 15 in the barrel 11, under the control of a hydraulic cylinder and piston unit 24, the cylinder of which is fixed to the base 10 and the piston of which is connected to the rear end of the unit 21. The screw 15 is adapted to be rotated, even during movement of the unit 21, and in the machine illustrated, this is accomplished by means of a hydraulic motor 25 carried on the unit 21 and driving the screw shaft extension 20 through the medium of a worm and gear drive 26. The screw 15 has a helical flight or land 27 which fits snugly within the inner surface 14 of the extruder barrel 11, as indicated best in FIGURES 2 and 3, so that the screw can feed the material effectively therethrough.

The forward or leading end of the screw 15 is provided with a head 30 and it is with this head that the present invention is associated. The head 30 is removably mounted on the forward end of the screw by means of a threaded inner end portion of the shank 31 screwed into a threaded socket in the forward end of the screw 15. The head is provided at its forward or nose end with a converging or conical surface 32 which is adapted to cooperate in the usual manner with a complemental socket in the outlet collar 16. The head is provided with a continuous peripheral flange 33 which projects outwardly into close proximity with the surface 14 of the barrel 11. An annular ball raceway 34 is formed in the head 30 behind the flange 33 and receives the balls 35 which fill it and are in cooperating relationship around the relatively reduced diameter shank 31 of the head (FIGURE 5). It will be noted that the transverse curvature of the raceway 34 is at a greater radius of curvature than that of the balls 35 so as to obtain a point contact between the balls and the raceway.

Figure 4:
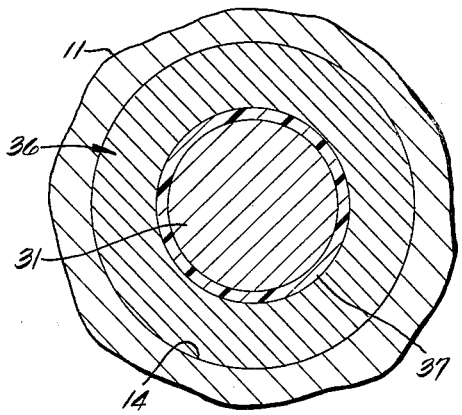
FIGURE 4 is a transverse sectional view taken substantially along line 4—4 of FIGURE 2.

Directly behind the balls 35 in surrounding relationship to the shank 31 of the head 30 is a ring 36. This ring has a tight fit within the barrel surface 14 so that it will usually not rotate relative thereto but is capable of sliding movement under pressure axially of that surface. An annular space 37 (FIGURES 2, 3 and 4) is provided between the ring and the shank 31 to provide a restricted passageway to permit passage of material through the ring. Directly behind the ring on the outer end of the screw 15 is a washer or ring 38. This ring is held against the end of the screw 15 by means of an annular clamping shoulder 39 formed on the shank 31. To remove the washer 38, the nose 30 is removed from the screw 15. Thus, the ring 36 is normally disposed between the washer 38, carried by the screw, and the balls 35 on the head 30 which is also carried by the screw. It is free to move axially to a limited extent on the shank 31. The forward surface of the ring 36 has a flat annular ball-retaining recess 40. This recess and the ball race surface 34 are so formed as to retain the balls even when the ring 36 moves rearwardly away from the head flange 33 (FIGURE 3) as far as possible. Thus, the balls will not drop out if the screw and mounted head are removed from the barrel.

In the example illustrated, the ring 36 serves as a part of a non-return valve assembly. Consequently, its rear surface is beveled or angled to provide a tapered valve surface 41. Also, the ring 38 is provided with a complemental reversely beveled or angled forward surface to provide a tapered valve seat 42. These cooperating surfaces, when engaged by the ring 36 moving to its rearwardmost position on the shank 31 (FIGURE 3), prevent rearward extrusion of material from the annular ring passageway 37 rearwardly over the screw flights or lands 27. When these surfaces are spaced apart by the ring 36 moving to its forwardmost position on the shank 31 (FIGURE 2) there is a restricted material passageway between these surfaces which communicates with the restricted ring passageway 37.

Thus, there is an antifriction arrangement between the ring 36 and the associated head 30 which prevents wear on the head 30 when the head is rotated relative to the ring. Furthermore, since the balls 35 are disposed between the head and the ring and in contact therewith, during relative rotation, the balls orbit in the raceway 34 and rotate about their centers. Small restricted passageways are provided between the balls, through which the material, being fed by the screw 15, will be forced. The balls will produce a kneading and homogenizing action of the material thereby serving to more effectively homogenize it.

The action of the antifriction plasticizer head of this invention will be more clearly understood from a description of the feeding and injecting operations particularly with reference to FIGURES 2 and 3. Assuming the feeding action is occurring, the usual granular or pelletized plastic material is fed into the heated barrel 11 and the screw 15 is driven in rotation to feed the material forwardly as indicated in FIGURE 2, through the space between the valve surfaces 41 and 42, through the annular space 37 and through the spaces between the balls 35 and finally beyond the flange 33 of the head into the injection chamber at the forward end of the barrel 11. The feeding of the material in this manner plasticizes the heated plastic material and this plasticizing action is greatly enhanced by the kneading action performed by the balls 35 as the material is forced therebetween. The material passing through the restricted passages between the balls is divided into individual relatively small streams but at the same time is worked and kneaded as the balls orbit and churn and swirl the streams. In this manner, the heated plastic material fed by the screw 15 is thoroughly mixed and plasticized. During this feeding action, the head 30 is rotating relative to the ring 36 but wear on the head will be minimized because of the location of the balls 35 therebetween.

Rotation of the screw 15 in the feeding action gradually moves the screw 15 bodily rearwardly in the barrel 11 until a sufficient charge of plasticized material is accumulated in the injection chamber ahead of the screw in the barrel 11. At this time, a suitable control, such as a limit switch (not shown) shuts off the hydraulic motor 25 to interrupt the drive to the screw and at about the same instant operates controls to actuate the hydraulic cylinder and piston unit 24 to move the unit 21 with the screw 15 forwardly in an injection stroke. As the screw and its head 30 move forwardly in the barrel 11, the valve seat 42 engages the cooperatively beveled surface 41 of the ring 36 to carry the ring 36 forwardly with the head 30, to thus forcibly eject the plasticized material outwardly through the nozzle or collar 16 and into the associated molding cavity of the machine. Engagement of the seat 42 with the beveled surface 41 of the ring 36 prevents the backward flow of material over the screw 15. Thus, the ring 36 serves as a combined piston and check valve during the injection stroke of the screw 15.

Figure 6:
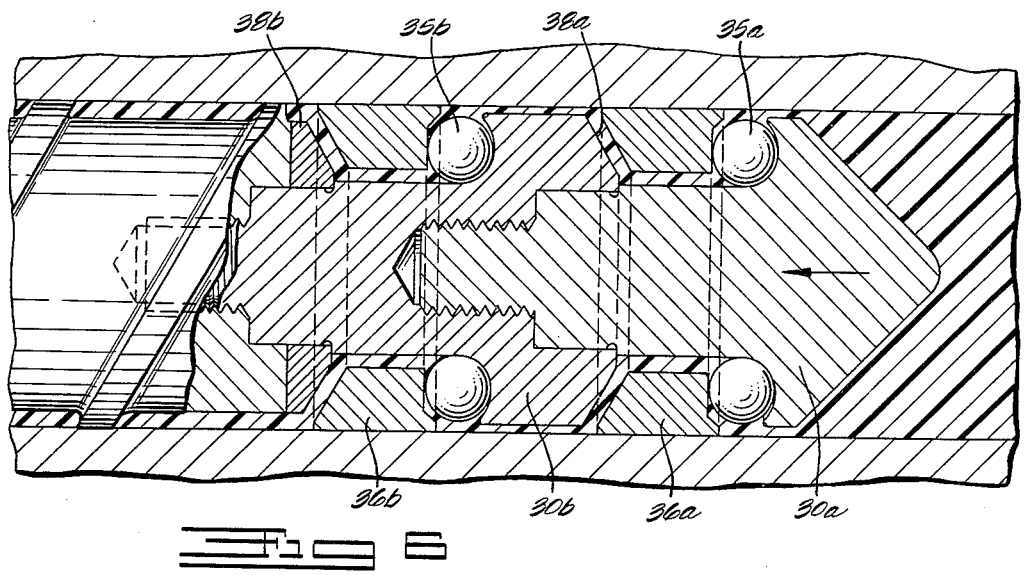
FIGURE 6 is an axial sectional view similar to FIGURE 2 but showing a multiple antifriction plasticizer arrangement associated with the extruder screw head.

In FIGURE 6, there is illustrated a multiple antifriction assembly and associated valve assembly in accordance with this invention. In this structure, the head comprises the two axially aligned and connected sections 30a and 30b. Two valve rings 36a and 36b are disposed on the respective head sections for limited axial movement. The forward end of the head section 30b is provided with a valve seat 38a for cooperating with the valve ring 36a. A valve washer 38b is provided on the forward end of the screw 15 for cooperating with the valve ring 36b. The forward set of balls 35a is provided between the ring 36a and the head section 30a and a rearward set of balls 35b is disposed between the ring 36b and the head section 30b. The action of this structure will be exactly the same as the previously described structure except that there will be a double kneading action on the plastic material by the axially spaced sets of balls 35a and 35b, respectively. Furthermore, there will be a double valve action by the respective rings 36a and 36b to prevent return flow of the plasticized material around the screw 15.

As previously indicated, this invention is not limited to an injection molding operation. For example, it may be used in an operation wherein the homogenized plastic material is simply extruded from the barrel in a desired cross-sectional shape.

It will be apparent that this invention provides an antifriction assembly between a relatively rotatable head portion and associated member of a screw-type extruding machine. This antifriction assembly not only serves to minimize wear on the head, with a consequent reduction of shutdown time of the machine, but also serves to more effectively plasticize the material fed by the screw past the head into the extrusion chamber of the barrel. Furthermore, if the associated member is the ring member of a non-return valve assembly on the head, the antifriction assembly cooperates in providing an axially movable ring member associated therewith which will function effectively in controlling the flow of plastic material past the head.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. Apparatus for feeding and plasticizing thermoplastic material comprising a casing defining an internal, elongated cylindrical chamber having an inlet toward one end thereof and an outlet at the opposite end thereof; means connected with said casing for supplying unplasticized thermoplastic material to the inlet of said chamber; heating means carried in heat transfer relation to said casing for heating materials supplied to the chamber of said casing; a rotary feed screw rotatably mounted in the chamber of said casing and operable upon rotation to advance material from the inlet of said chamber toward the outlet thereof; a plasticizer head connected with the leading end of said feed screw and rotatable therewith, said head including a relatively reduced diameter shank portion; an annular ring member encircling the reduced diameter shank portion of said head and disposed in radially spaced relation thereto, said ring member having an outer peripheral surface disposed in close-fitting wiping engagement with the walls of said chamber; and a circular row of ball bearings disposed between said ring member and said head and supporting said head for relative antifrictional rotation within said ring member, said row of ball bearings defining with said ring member and said head a plurality of relatively restricted passages through which material advanced by said feed screw must pass in its movement toward the outlet of said chamber.

2. Apparatus as defined in claim 1, wherein said feed screw is mounted for both rotative and bodily axial movement within the chamber of said casing, and wherein said ring member is arranged for limited axial movement with respect to said feed screw.

3. Apparatus as defined in claim 2, wherein the leading end of said feed screw is provided with an annular valve seat normally disposed in spaced relation to said ring member, but engageable with said ring member upon bodily axial movement of said feed screw toward the outlet of said chamber to prevent backflow of material across said screw.

4. In an apparatus for plasticizing and feeding plastic material; a barrel formed with an elongated cylindrical chamber having an inlet toward one end thereof and an outlet at the opposite end thereof; a rotary feed screw positioned in the chamber of said barrel and operable upon rotation to advance a plastic material introduced into the inlet of said chamber to the outlet thereof, said screw including a forward head portion disposed in inwardly spaced relation to the well of said barrel defining said chamber and a relatively reduced diameter, cylindrical shank portion connecting said head portion with said screw; a ring member carried in said barrel in concentrically spaced, encircling relation to the shank portion of said screw, said ring member defining with the shank portion of said screw a relatively restricted, annular passage through which a plastic material advanced by said screw may pass toward said head portion; and an annular row of ball bearings interposed between said head portion and said ring member and defining a plurality of separate passages communicating with the annular passage between said shank portion and said ring member.

References Cited by the Examiner
FOREIGN PATENTS 615,178 2/61 Canada.
880,333 10/61 Great Britain.

J. SPENCER OVERHOLSER, *Primary Examiner.*

MICHAEL V. BRINDISI, *Examiner.*